United States Patent [19]

Min

[11] Patent Number: 5,754,331

[45] Date of Patent: May 19, 1998

[54] THIN-FILM ACTUATED MIRROR ARRAY AND METHOD FOR THE MANUFACTURE THEREOF

[75] Inventor: Yong-ki Min, Seoul, Rep. of Korea

[73] Assignee: Daewoo Electronics Co., Ltd., Seoul, Rep. of Korea

[21] Appl. No.: 858,715

[22] Filed: May 19, 1997

[30] Foreign Application Priority Data

May 29, 1996 [KR] Rep. of Korea ............... 1996-18394

[51] Int. Cl.[6] .................................................. G02B 26/00
[52] U.S. Cl. ..................... 359/291; 359/295; 359/224; 359/846; 310/328
[58] Field of Search ............................... 359/291, 290, 359/295, 222, 221, 224, 846, 848; 310/328, 333, 366

[56] References Cited

U.S. PATENT DOCUMENTS

| | | | |
|---|---|---|---|
| 5,581,393 | 12/1996 | Min | 359/224 |
| 5,610,773 | 3/1997 | Min | 359/295 |
| 5,627,673 | 5/1997 | Min | 359/290 |
| 5,636,051 | 6/1997 | Lim | 359/290 |

*Primary Examiner*—Loha Ben
*Attorney, Agent, or Firm*—Anderson Kill & Olick P.C.

[57] ABSTRACT

An inventive array of M×N thin film actuated mirrors includes an active matrix and an array of M×N actuating structures. Each of the actuating structures includes an upper thin film electrode, a thin film electrodisplacive member, a lower thin film electrode, an elastic member and a conduit. In the array, since the upper thin film electrode is electrically connected individually to the active matrix through the conduit in each of the actuated mirrors, if one thereof becomes inoperable for any reason, e.g., short-circuit due to the scratch in the upper thin film electrode, other thin film actuated mirrors in the same row or column in the array 200 are not affected.

22 Claims, 13 Drawing Sheets

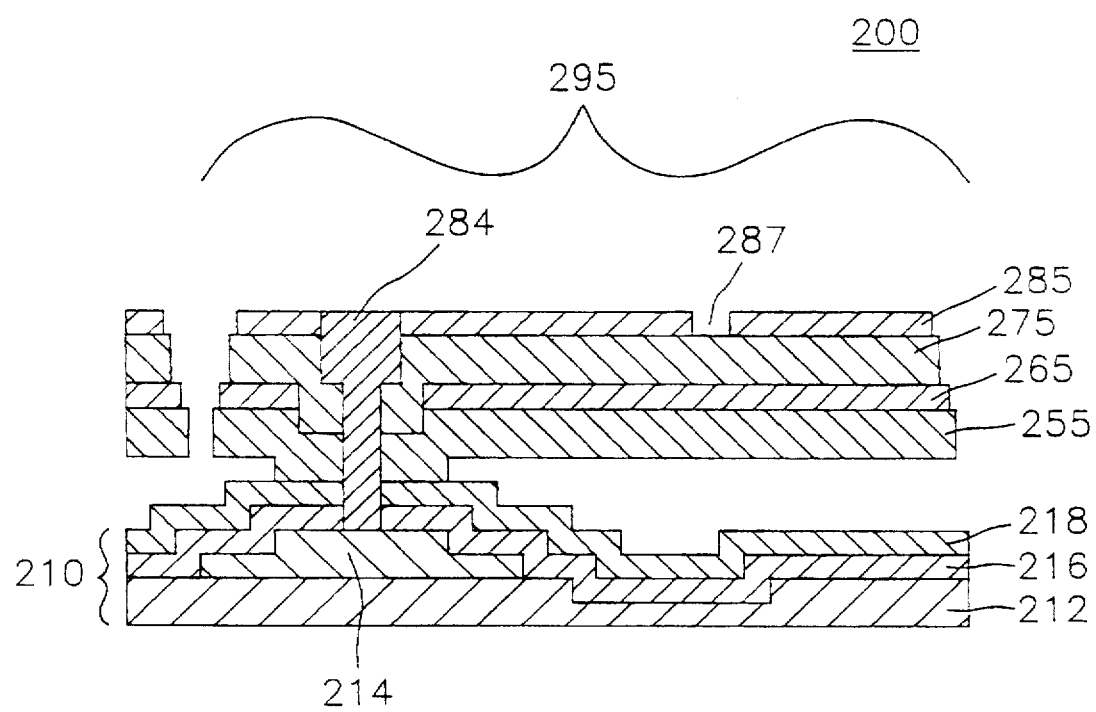

5,754,331

THIN-FILM ACTUATED MIRROR ARRAY AND METHOD FOR THE MANUFACTURE THEREOF

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is illustrated a cross sectional view setting forth an array of M×N thin film actuated mirrors 100, wherein M and N are integers, disclosed in a copending commonly owned application, U.S. application Ser. No. 08/602,928, entitled "THIN FILM ACTUATED MIRROR ARRAY FOR USE IN AN OPTICAL PROJECTION SYSTEM".

The array 100 includes an active matrix 110, a passivation layer 116, an etchant stopping layer 118 and an array of M×N actuating structures 120.

The active matrix 110 includes a substrate 112, an array of M×N transistors(not shown) and an array of M×N connecting terminals 114. Each of the connecting terminals 114 is electrically connected to a corresponding transistor in the array of transistors.

The passivation layer 116, made of, e.g., a phosphorsilicate glass(PSG) or silicon nitride, and having a thickness of 0.1–2 μm, is located on top of the active matrix 110.

The etchant stopping layer 118, made of silicon nitride, and having a thickness of 0.1–2 μm, is positioned on top of the passivation layer 116.

Each of the actuating structures 120 has a distal and a proximal ends, and further includes a tip(not shown) at the distal end thereof and an etching aperture(not shown) traversing vertically therethrough. Each of the actuating structures 120 is provided with a first thin film electrode 132, a thin film electrodisplacive member 126, a second thin film electrode 124, an elastic member 122 and a conduit 128. The first thin film electrode 132 made of an electrically conducting and light reflecting material, e.g., aluminum(Al) or silver(Ag), is located on top of the thin film electrodisplacive member 126, and is divided into an actuating and a light reflecting portions 130, 140 by a horizontal stripe 134, wherein the horizontal stripe 134 disconnects electrically the actuating and the light reflecting portions 130, 140. The actuating portion 130 thereof is electrically connected to ground, thereby functioning as a mirror as well as a common bias electrode. The light reflecting portion 140 thereof functions as the mirror. The thin film electrodisplacive member 126, made of a piezoelectric material, e.g., lead zirconium titanate(PZT), or an electrostrictive material, e.g., lead magnesium niobate(PMN), is placed on top of the second thin film electrode 124. The second thin film electrode 124, made of an electrically conducting material, e.g., platinum/tantalum(Pt/Ta), is located on top of the elastic member 126, and is electrically connected to a corresponding transistor through the conduit 128 and the connecting terminal 114, wherein the second thin film layer 124 is iso-cut into an array of M×N second thin film electrodes 124 by using a dry etching method such that each of the second thin film electrodes 124 is electrically disconnected from other second thin film electrodes 124(not shown), thereby allowing it to function as a signal electrode. The elastic member 122, made of a nitride, e.g., silicon nitride, is positioned below the second thin film electrode 124. A bottom portion at the proximal end thereof is attached to top of the active matrix 110, with the etchant stopping 118 and the passivation layers 116 partially intervening therebetween, thereby cantilevering the actuating structure 120. The conduit 128, made of a metal, e.g., tungsten(W), extends from top of the thin film electrodisplacive member 126 to top of a corresponding connecting terminal 114, thereby connecting electrically the second thin film electrode 124 to the connecting terminal 114. The conduit 128 extending downward from top of the thin film electrodisplacive member 126 and the first thin film electrode 132 placed on top of the thin film electrodisplacive member 126 in each of the thin film actuated mirrors 150 are not electrically connected to each other.

There are certain shortcomings associated with the above described array 100 of M×N thin film actuated mirrors 150. Since the first thin film electrode 132 in each of the actuating structures 120 interconnected with other first thin film electrodes(not shown) in the same row or column in the array 100, if one of the actuating structures 120 becomes inoperable for any reason, e.g., short-circuit due to the scratch in the first thin film electrode 132, all of the other actuating structures 120 in the same row or column in the array 100 become inoperable.

SUMMARY OF THE INVENTION

It is, therefore, a primary object of the present invention to provide an array of M×N thin film actuated mirrors for use in an optical projection system, wherein an upper thin film electrode in each one of the thin film actuated mirrors is separated from other upper thin film electrodes in any one of the other actuated mirrors in the same row or column of the array, thereby allowing a signal to be applied individually to each of the thin film actuated mirrors.

It is another object of the present invention to provide a method for manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix; and an array of M×N actuating structures, each of the actuating structures including an upper thin film electrode, a thin film electrodisplacive member, a lower thin film electrode, an elastic member and a conduit, the thin film elctorodisplacive member being disposed between the upper and the lower thin film electrodes, and the elastic member being located below the lower thin film electrode, wherein the upper thin film electrode is electrically disconnected from other upper thin film electrodes and is connected electrically to the active matrix through the conduit.

In accordance with another aspect of the present invention, there is provided a method for manufacturing an array of M×N thin film actuated mirrors, wherein M and N are integers, for use in an optical projection system, the method comprising the steps of: preparing an active matrix including a substrate and an array of M×N connecting terminals; forming a passivation layer on top of the active matrix; depositing an etchant stopping layer on top of the passivation layer; forming a thin film sacrificial layer on top of the etchant stopping layer; creating an array of M×N pairs of empty cavities in the thin film sacrificial layer in such a way that one of the empty cavities in each pair is aligned with one of the connecting terminals; depositing an elastic layer and a lower thin film layer, successively, on top of the thin film sacrificial layer including the empty cavities; forming an array of M×N pairs of holes in such a way that one of the holes in each pair exposes a portion of the elastic layer on top of the corresponding connecting terminal; depositing a thin film electrodisplacive layer on top of the lower thin film layer including the holes; depositing an upper thin film layer on top of the thin film electrodisplacive layer; iso-cutting the upper thin film layer to form an array of M×N upper thin film electrodes to thereby form a multiple layered structure, each of the upper thin film electrodes being disconnected from each other; patterning the multiple layered structure into an array of M×N actuated mirror structures, until the thin film sacrificial layer is exposed; and removing the thin film sacrificial layer to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIGS. 5A to 5E present partial cross sectional views illustrating another method for manufacturing the array of M×N thin film actuated mirrors illustrated in FIG. 2.

DETAILED DESCRIPTION OF THE PREFERRED EMBODIMENTS

Figure 1:
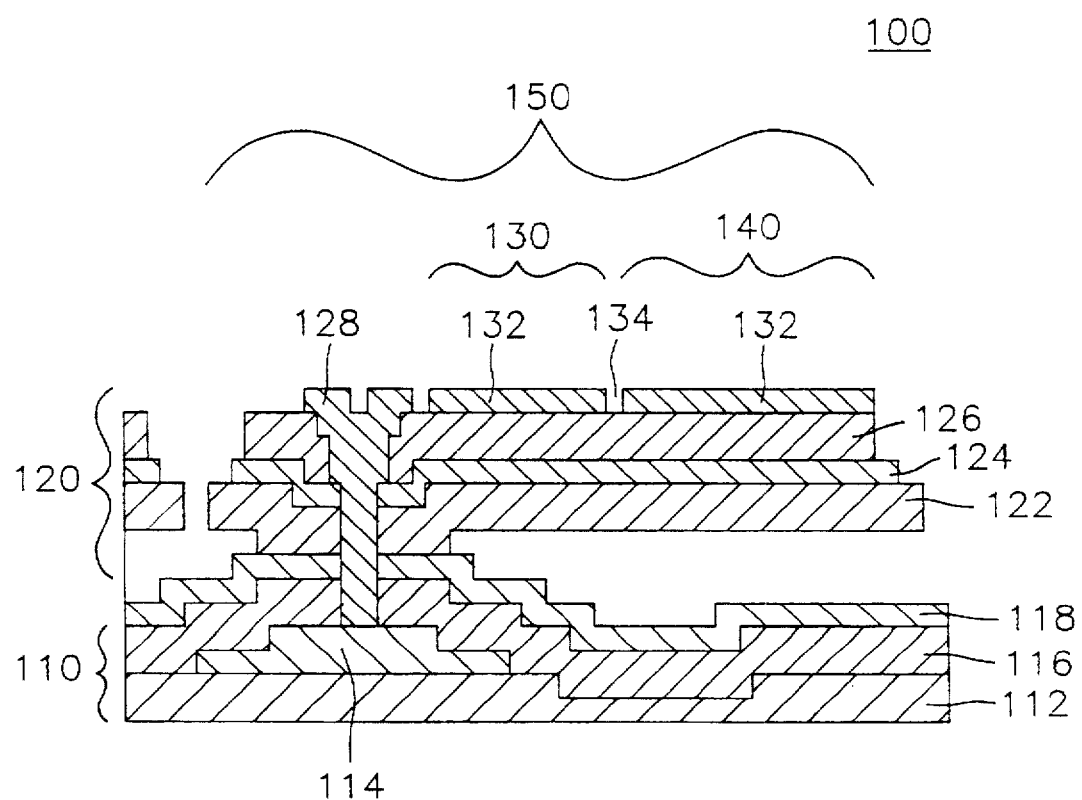
FIG. 1 is a schematic partial cross sectional view illustrating an array of M×N thin film actuated mirrors previously disclosed.
Figure 2:
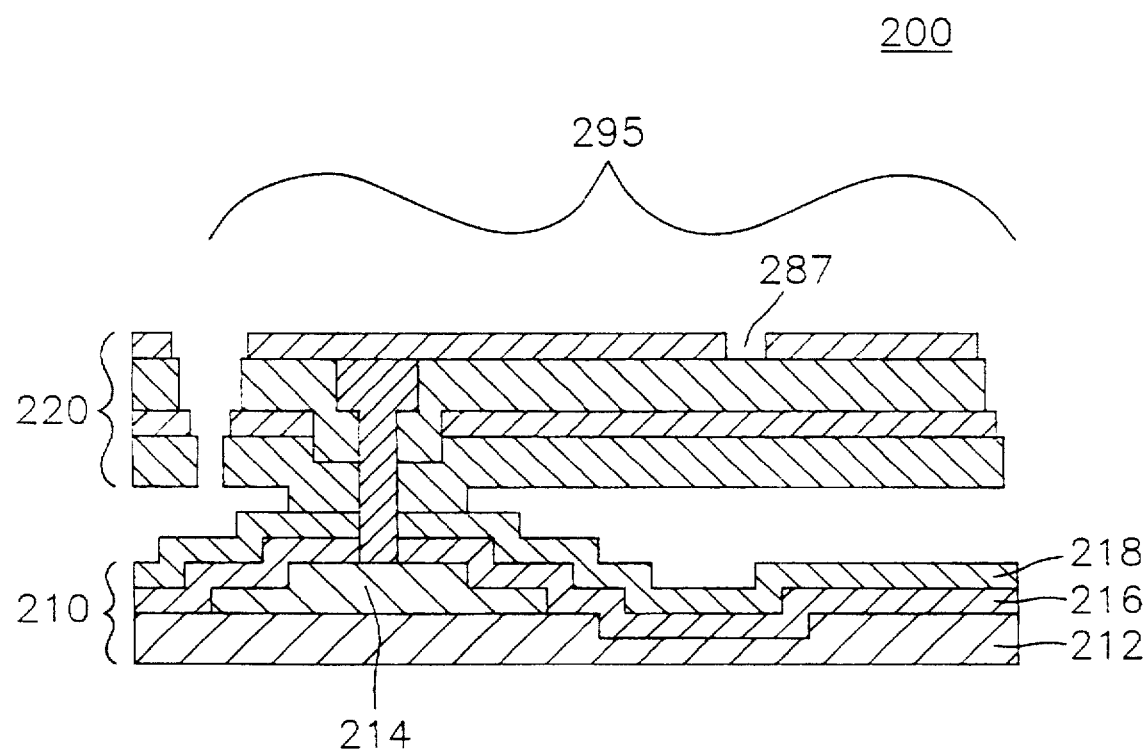
FIG. 2 depicts a partial cross sectional view setting forth an array of M×N thin film actuated mirrors in accordance with a preferred embodiment of the present invention.
Figure 3:
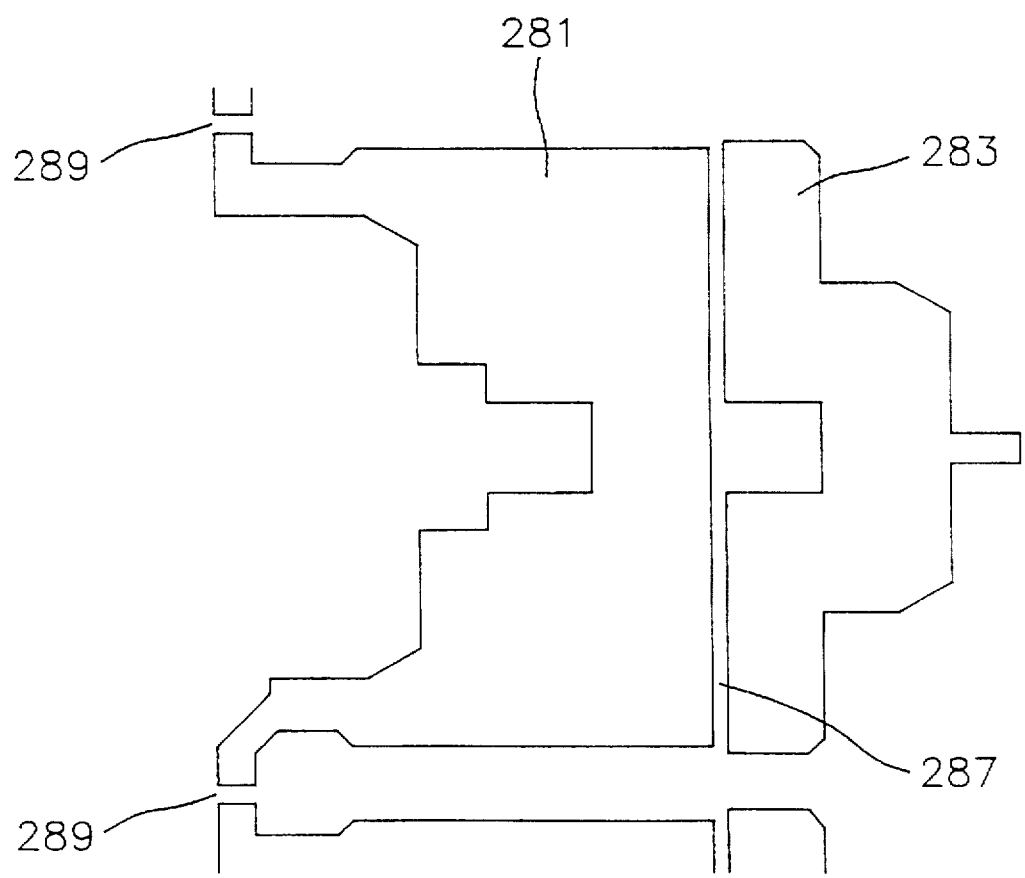
FIG. 3 illustrates a top view of the upper thin film electrode constituting each of the thin film actuated mirrors shown in FIG. 2.

There are provided in FIGS. 2, 3, 4A to 4N and 5A to 5E a cross sectional view setting forth array 200 of M×N thin film actuated mirrors 295, wherein M and N are integers, for use in an optical projection system in accordance with a preferred embodiment of the present invention, a top view of the thin film actuated mirror 295 in the array 200, and schematic cross sectional views illustrating methods for manufacturing the array 200 of M×N thin film actuated mirrors 295, shown in FIGS. 2 and 3, respectively. It should be noted that like parts appearing in FIGS. 2, 3, 4A to 4N and 5A to 5E are represented by like reference numerals.

In FIG. 2, there is provided a partial cross sectional view of the array 200 of M×N thin film actuated mirrors 295 in accordance with one preferred embodiment of the present invention, the array 200 comprising an active matrix 210, a passivation layer 216, an etchant stopping layer 218 and an array of M×N actuating structures 220.

The active matrix 210 includes a substrate 212, an array of M×N transistors(not shown) and an array of M×N connecting terminals 214. Each of the connecting terminals 214 is electrically connected to a corresponding transistor in the array of transistors.

The passivation layer 216, made of, e.g., a phosphorsilicate glass(PSG) or silicon nitride, and having a thickness of 0.1–2 μm, is located on top of the active matrix 210.

The etchant stopping layer 218, made of silicon nitride, and having a thickness of 0.1–2 μm, is positioned on top of the passivation layer 216.

Each of the actuating structures 220 is provided with an upper thin film electrode 285, a thin film electrodisplacive member 275, a lower thin film electrode 265, an elastic member 255 and a conduit 282. The upper thin film electrode 285 made of an electrically conducting and light reflecting material, e.g., aluminum(Al) or silver(Ag), and the lower thin film electrode 265 made of an electrically conducting material, e.g., Pt/Ta, are located on top and bottom of the thin film electrodisplacive member 275, respectively. Each of the upper thin film electrode 285 is electrically disconnected from the upper thin film electrode 285 in any other thin film actuated mirrors 295 by iso-cut portions 289, as shown in FIG. 3, and connected electrically to the active matrix 210 through the corresponding conduit 282, thereby functioning as a signal electrode. The thin film electrodisplacive member 275 is made of a piezoelectric material, e.g., lead zirconium titanate(PZT). The elastic member 255 is located below the lower thin film electrode 265. The lower thin film electrode 265 in each of the thin film actuated mirrors 295 is electrically connected to the lower thin film electrode 265 of other thin film actuated mirrors 295 in the same row or column in the array 200, which, in turn, is connected to a bias source thereby functioning as a bias electrode in the thin film actuated mirror 295. The elastic member 255, positioned below the lower thin film electrode 265, is made of a nitride, e.g., silicon nitride. A bottom portion at the proximal end thereof is secured to top of the active matrix 210, thereby cantilevering the actuating structure 220. The conduit 282, made of a metal, e.g., tungsten (W), extends from bottom of the upper thin film electrode 285 to top of the corresponding connecting terminal 214, thereby connecting electrically the upper thin film electrode 285 to the connecting terminal 214.

In FIG. 3, there is illustrated a top view of the thin film actuated mirror 295 shown in FIG. 2

In the inventive array 200 of M×N thin film actuated mirrors 295, the upper thin film electrodes 285 in each of the thin film actuated mirrors 295 is divided into the actuating and the light reflecting portions 281, 283 by a horizontal stripe 287. During the operation of each of the thin film actuated mirrors 295, portions of the thin film electrodisplacive member 275, the lower thin film electrode 265 and the elastic member 255 located below the actuating portion 281 of the upper thin film electrode 285 deform, while the remaining portions stay planar, allowing the light reflecting portion 283 of the upper thin film electrode 285 to stay also planar, thereby allowing the thin film actuated mirror 295 to reflect the light beam more accurately and efficiently impinging thereonto, which increasing the optical efficiency of the array 200. In this case, the actuating portion 281 of the upper thin film electrode 285 in each of the thin film actuated mirrors 295 is electrically disconnected from other actuating portions by the iso-cut portions 289 located therebetween, thereby allowing a signal to be applied individually to each of the thin film actuated mirrors 295.

Figure 4A:
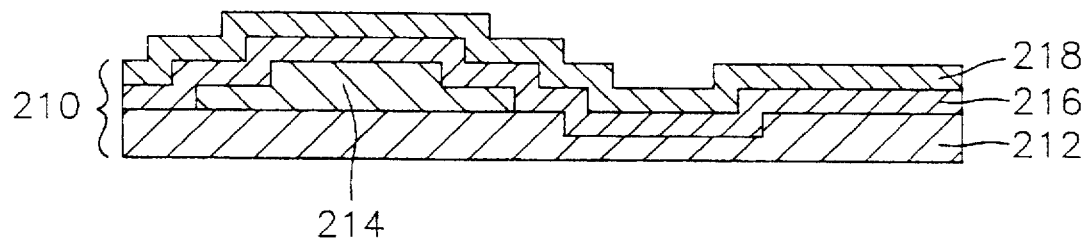
FIGS. 4A to 4N represent partial cross sectional views setting forth a method for the manufacture of an array of M×N thin film actuated mirrors shown in FIG. 2.
Figure 4B:
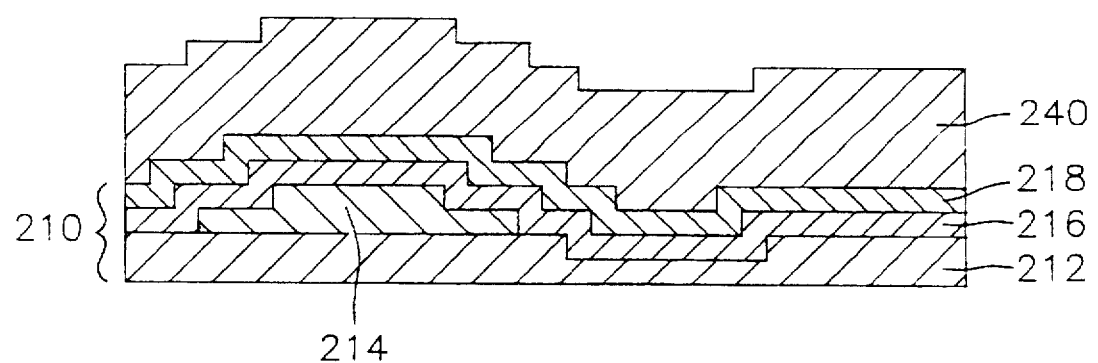
Figure 4C:
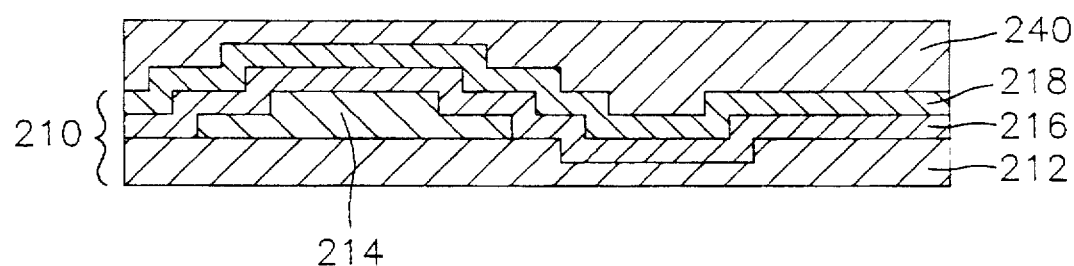
Figure 4D:
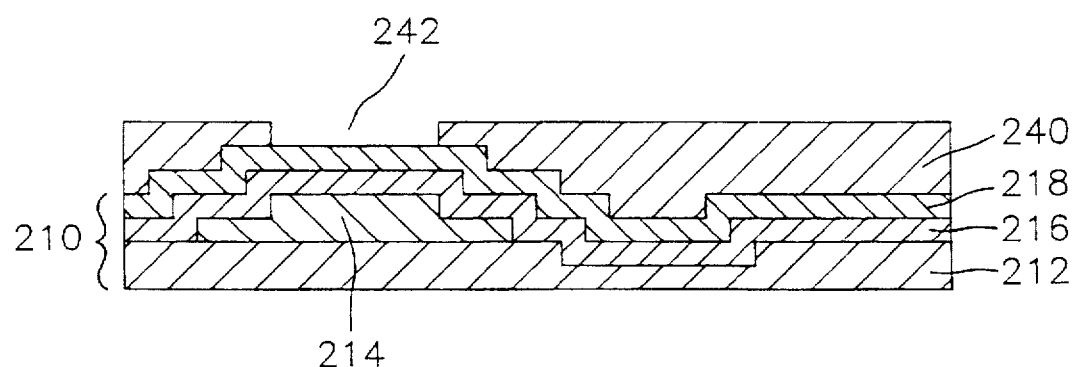
Figure 4E:
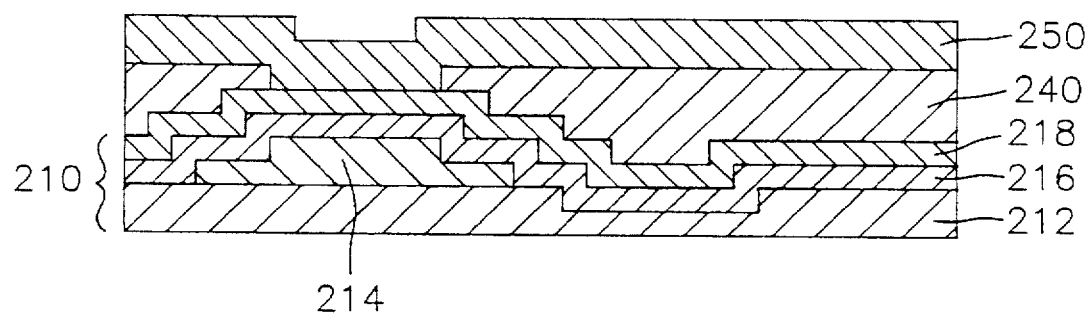
Figure 4F:
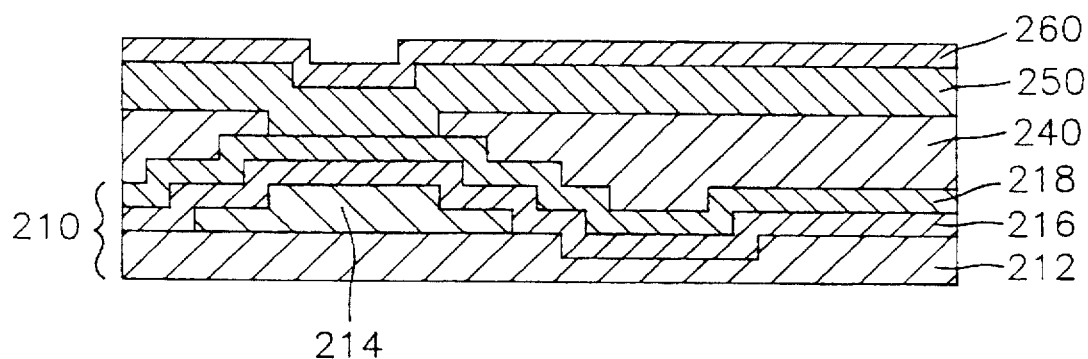
Figure 4G:
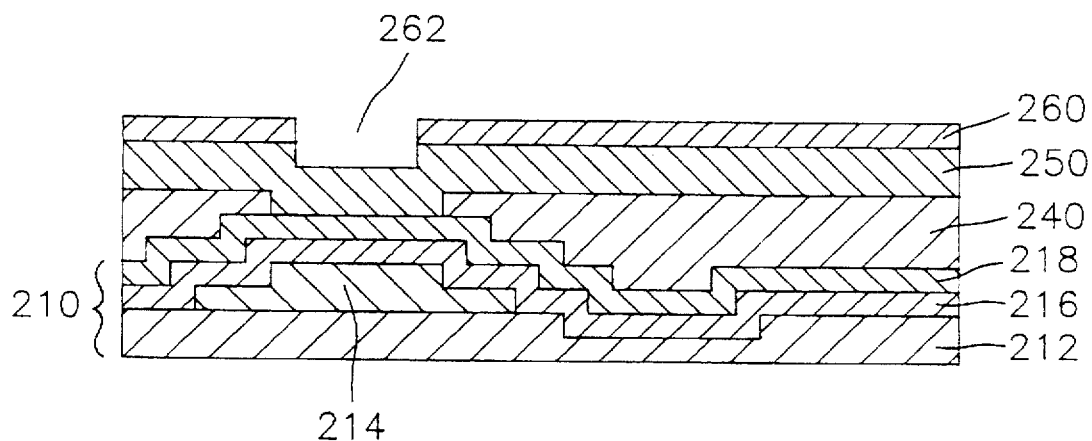
Figure 4H:
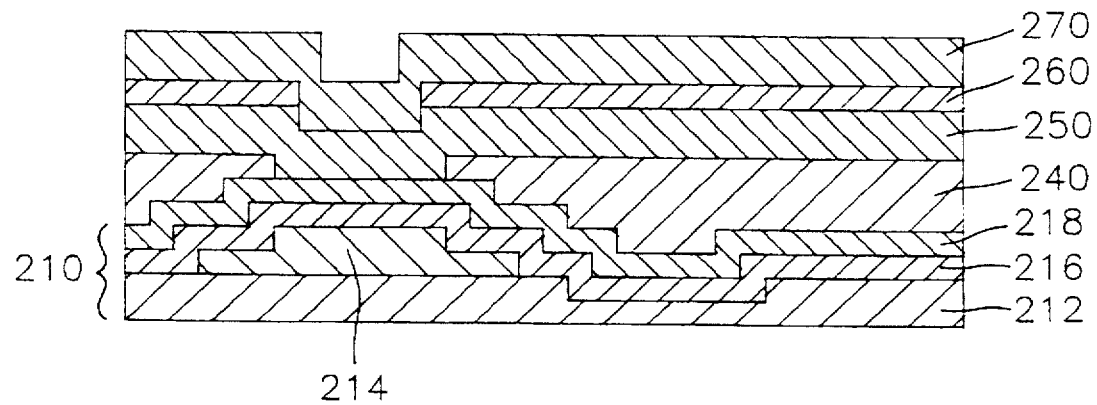
Figure 4I:
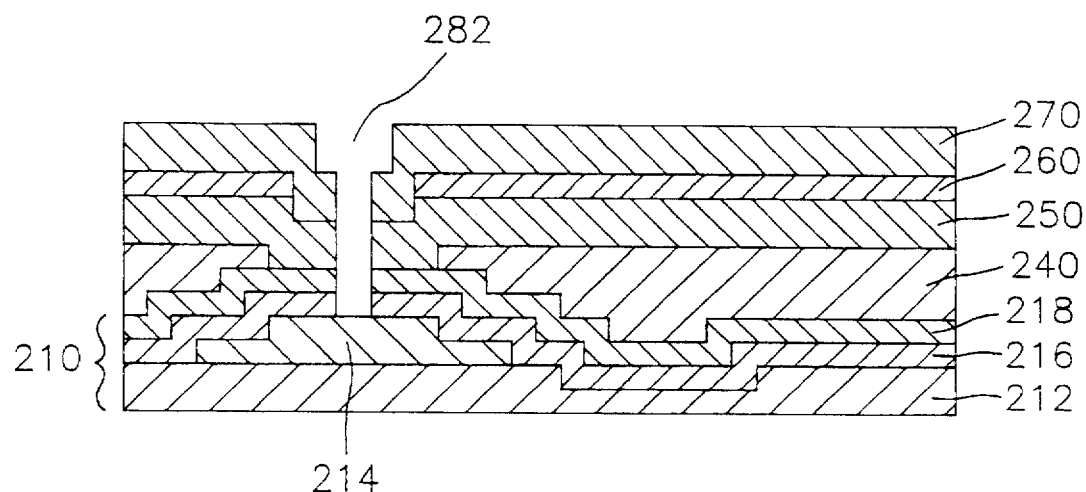
Figure 4J:
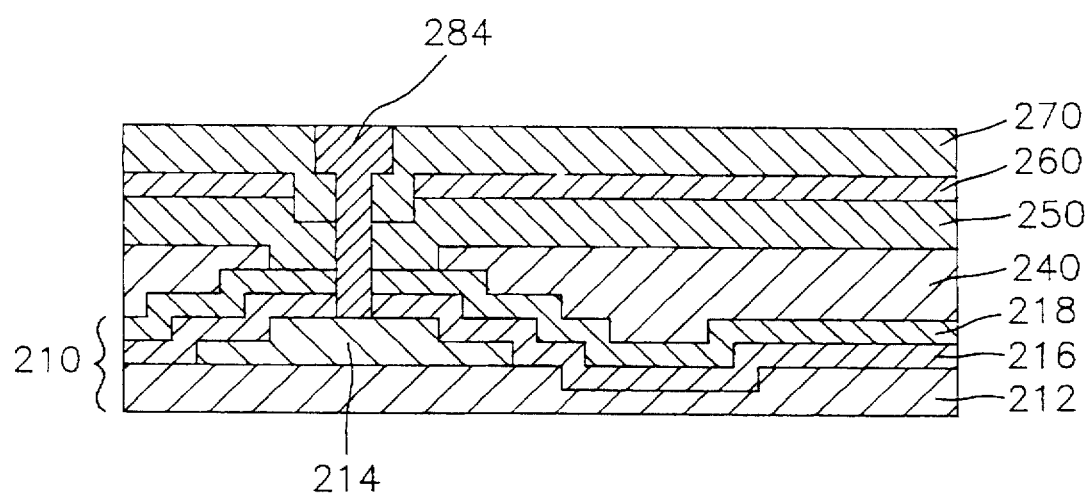
Figure 4K:
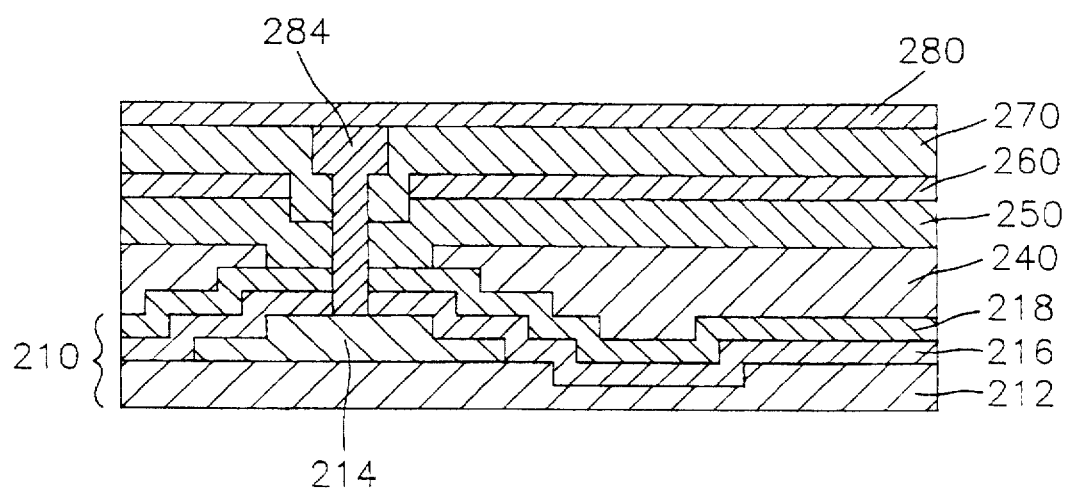
Figure 4L:
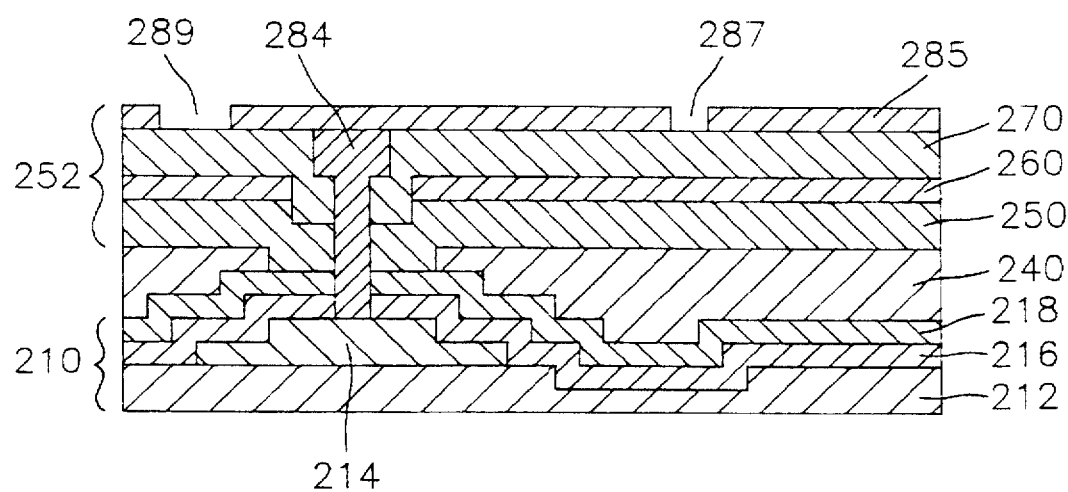
Figure 4M:
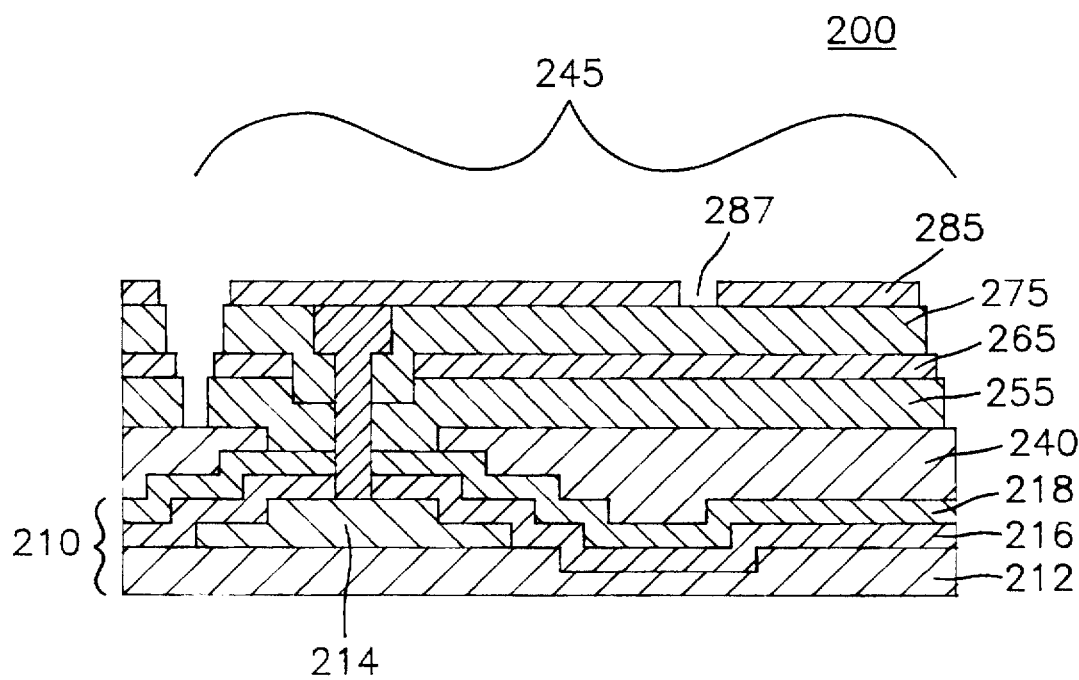
Figure 4N:
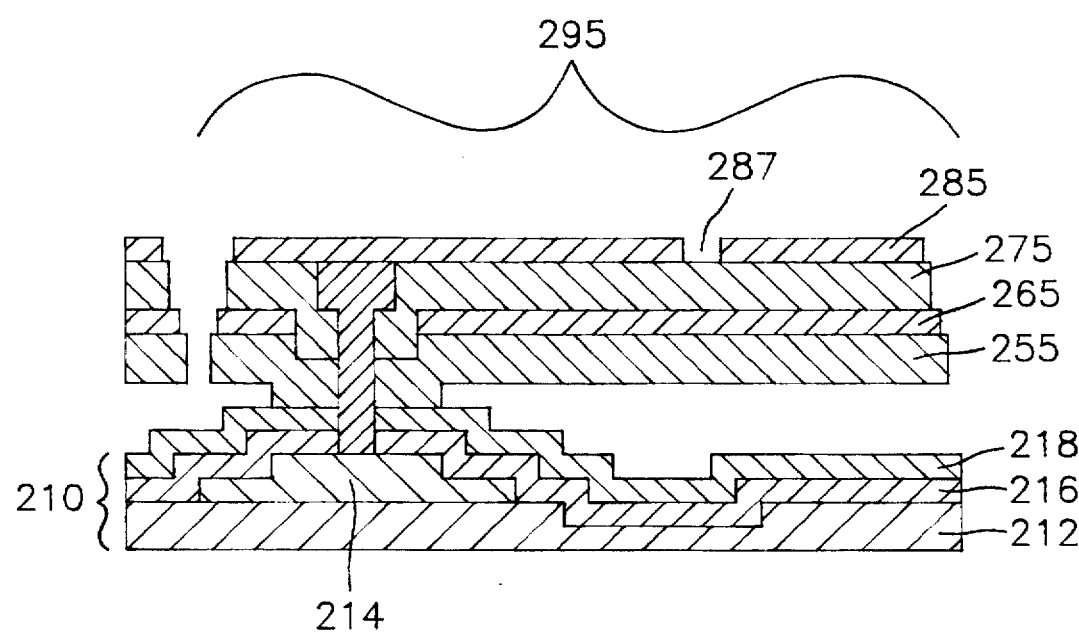

In FIGS. 4A to 4N, there are provided partial schematic cross sectional views illustrating a method for the manufacture of the array 200 of M×N thin film actuated mirrors 295, as shown in FIGS. 2 and 3, in accordance with a first preferred embodiment of the present invention.

The process for the manufacture of the array 200 begins with the preparation of an active matrix 210 including a substrate 212, an array of M×N connecting terminals 214 and an array of M×N transistors(not shown). The substrate 212 is made of an insulating material, e.g., Si-wafer. Each of the connecting terminals 214 is electrically connected to a corresponding transistor in the array of transistors. In a subsequent step, there is formed a passivation layer 216, made of, e.g., a phosphor-silicate glass(PSG) or silicon nitride, and having a thickness of 0.1–2 µm, on top of the active matrix 210 by using, e.g., a CVD or a spin coating method. Thereafter, an etchant stopping layer 218, made of silicon nitride, and having a thickness of 0.1–2 µm, is deposited on top of the passivation layer 216 by using, e.g., a sputtering or a CVD method, as shown in FIG. 4A.

Then, a thin film sacrificial layer 240 is formed on top of the etchant stopping layer 218, as shown in FIG. 4B. The thin film sacrificial layer 240 is formed by using a sputtering or an evaporation method if the thin film sacrificial layer 240 is made of a metal, a CVD or a spin coating method if the thin film sacrificial layer 240 is made of a PSG, or a CVD method if the thin film sacrificial layer 240 is made of a poly-Si.

Next, top of the thin film sacrificial layer 240 is made flat by using a spin on glass(SOG) method or a chemical mechanical polishing(CMP) method, followed by a scrubbing method, as shown in FIG. 4C.

Subsequently, an array of M×N pairs of empty cavities 242 is created in the thin film sacrificial layer 240 in such a way that one of the empty cavities 242 in each pair is aligned with one of the connecting terminals 214 by using a dry or an wet etching method, as shown in FIG. 4D.

In a next step, an elastic layer 250, made of a nitride, e.g., silicon nitride, and having a thickness of 0.1–2 µm, is deposited on top of the thin film sacrificial layer 240 including the empty cavities 242 by using a CVD method, as shown in FIG. 4E. During the deposition, the stress inside the elastic layer 250 is controlled by changing the ratio of the reactant gases as a function of time.

Thereafter, a lower thin film layer 260, made of an electrically conducting material, e.g., Pt/Ta, and having a thickness of 0.1–2 µm, is formed on top of the elastic layer 250 by using a sputtering or a vacuum evaporation method, as shown in FIG. 4F.

Then, an array of M×N pairs of holes 262 is formed in the lower thin film layer 260 in such a way that one of the holes in each pair exposes a portion of the elastic layer on top of the corresponding connecting terminal, as illustrated in FIG. 4G.

Thereafter, a thin film electrodisplacive layer 270, made of a piezoelectric material, e.g., PZT, or an electrostrictive material, e.g., PMN, and having a thickness of 0.1–2 µm, is deposited on top of the lower thin film layer 260 having holes 262 by using an evaporation, a Sol-Gel, a sputtering or a CVD method, as shown in FIG. 4H. The thin film electrodisplacive layer 270 is then heat treated to allow a phase transition to take place by using a rapid thermal annealing(RTA) method.

Since the thin film electrodisplacive layer 270 is sufficiently thin, there is no need to pole it in case it is made of a piezoelectric material: for it can be poled with the electric signal applied during the operation of the thin film actuated mirrors 295.

In a subsequent step, an array of M×N openings 282 is created by using an etching method, wherein each of the openings 282 extends from top of the thin film electrodisplacive layer 270 to top of a corresponding connecting terminal 214, as shown in FIG. 4I.

In a following step, the conduit 284 is formed by filling a portion of each of the openings 282 with a metal, e.g., tungsten(W), using, e.g., a lift-off method. In the preferred embodiment of the present invention, each of the conduits 284 is electrically disconnected from the lower thin film layer 260 by the material making up the elastic layer 250, as presented in FIG. 4J.

Thereafter, an upper thin film layer 280, made of an electrically conducting and light reflecting material, e.g., aluminum(Al) or silver(Ag), and having a thickness of 0.1–2 µm, is formed on top of the thin film electrodisplacive layer 270 and the conduits 284 by using a sputtering or a vacuum evaporation method, as shown in FIG. 4K.

The upper thin film layer 280 is then patterned and iso-cut into an array of M×N upper thin film electrodes 285 to thereby form a multiple layered structure 252 by using a dry etching method, such that each of the upper thin film electrodes 285 includes an actuating and a light reflecting portions 281, 283, the actuating and the light reflecting portions 281, 283 being defined by a horizontal stripe 287, and the upper thin film electrodes 285 being electrically disconnected from other upper thin film electrodes 285 by the iso-cut portions 289, as shown in FIG. 4L.

In an ensuing step, as shown in FIG. 4M, the multiple layered structure 252 is patterned into an array of M×N semifinished actuated mirrors 245 by using a photolithography or a laser trimming method, until the thin film sacrificial layer 240 is exposed. Each of the M×N semifinished actuated mirrors 245 includes an upper thin film electrode 285, a thin film electrodisplacive member 275, a lower thin film electrode 265, a conduit 284 and an elastic member 255.

The preceding step is then followed by completely covering each of the semifinished actuated mirrors 245 with a thin film protection layer(not shown).

The thin film sacrificial layer 240 is then removed by using an wet etching method using an etchant or a chemical, e.g., hydrogen fluoride(HF) vapor, thereby forming a driving space for each of the thin film actuated mirrors 295.

Next, the thin film protection layer is removed.

Finally, the active matrix 210 is completely diced into a desired shape, by using a photolithography or a laser trimming method to thereby form the array 200 of M×N thin film actuated mirrors 295, as shown in FIG. 4N.

Alternatively, in FIGS. 5A to 5E, there are shown partial cross sectional views illustrating a method for manufacturing the array 200 of M×N thin film actuated mirrors 295 in accordance with a second preferred embodiment of the present invention, wherein the steps for forming the second embodiment is identical to the steps for forming the first embodiment shown in FIGS. 4A to 4M, until the step for forming the thin film electrodisplacive layer 270 on top of the lower thin film layer 260 having holes 262.

Figure 5A:
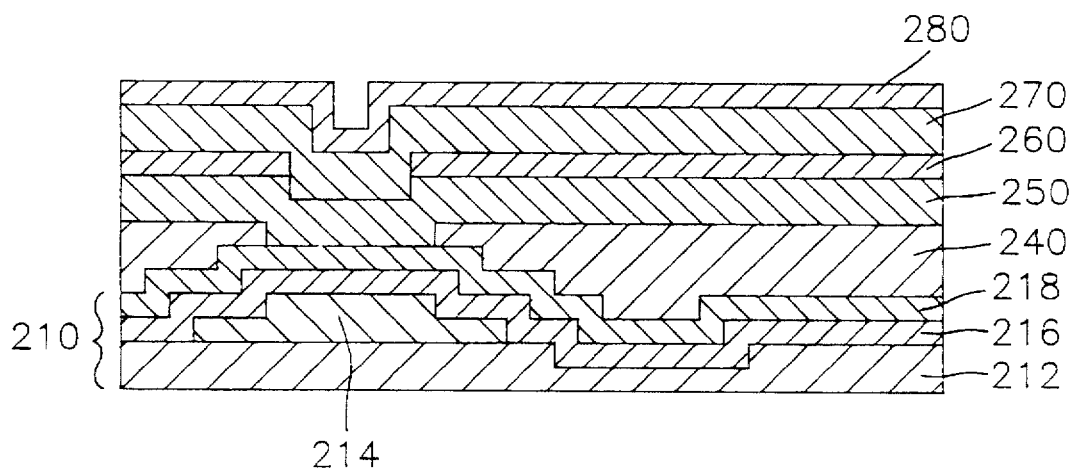

Instead of forming an array of M×N conduits 284, in the second embodiment, the upper thin film layer 280, made of an electrically conducting and light reflecting material, e.g., aluminum(Al) or silver(Ag), and having a thickness of 0.1–2 μm, is formed on top of the thin film electrodisplacive layer 270 by using a sputtering or a vacuum evaporation method, as shown in FIG. 5A.

Figure 5B:
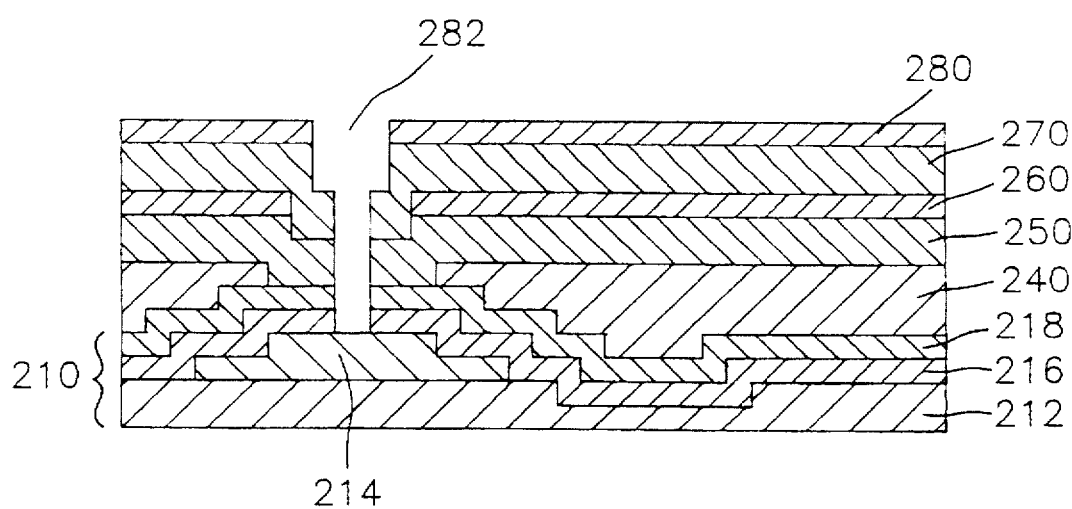
Figure 5C:
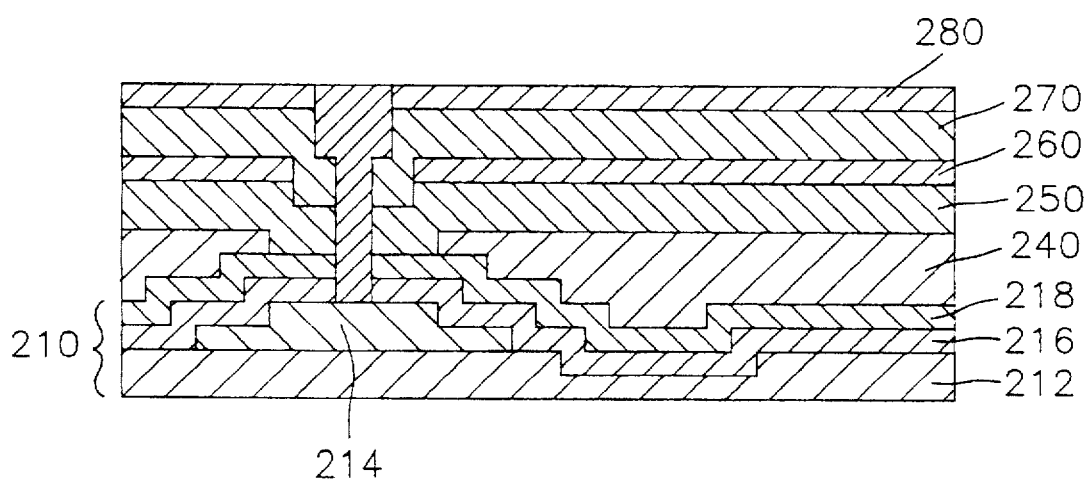

Subsequently, an array of M×N openings 282 is created by using an etching method, wherein each of the openings 282 extends from top of the upper thin film layer 280 to top of a corresponding connecting terminal 214, thereby exposing a portion of the corresponding connecting terminals 214, as shown in FIG. 5B.

In a following step, the conduit 284 is formed by filling a portion of each of the openings 282 with a metal, e.g., tungsten(W), using, e.g., a lift-off method, thereby obtaining a multiple layered structure 252. The conduits 284 extends from top of the corresponding connecting terminal 214 to top of the upper thin film layer 280 to thereby allow the conduits 284 to connect electrically to the upper thin film layer 280 and the corresponding connecting terminal 214. In the preferred embodiment of the present invention, each of the conduits 284 is electrically disconnected from the lower thin film layer 260 by the material making up the elastic member 250, as presented in FIG. 5C.

Figure 5D:
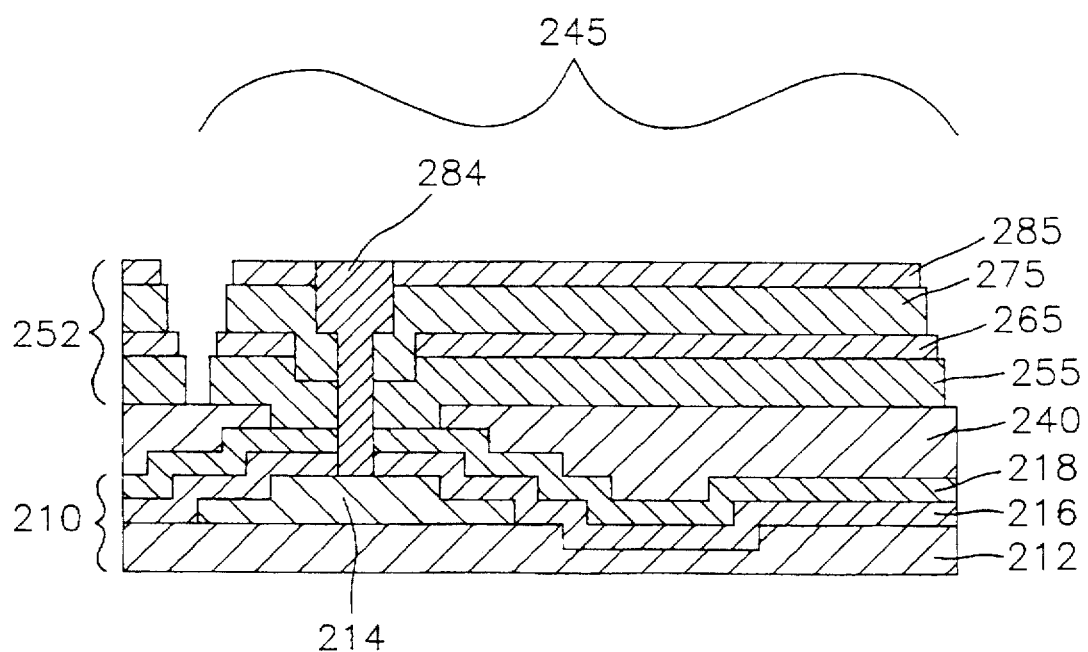

In an ensuing step, as shown in FIG. 5D, the multiple layered structure 252 is patterned into an array of M×N semifinished actuated mirrors 245 by using a photolithography or a laser trimming method, until the thin film sacrificial layer 240 is exposed. Each of the M×N semifinished actuated mirrors 245 includes an upper thin film electrode 285, a thin film electrodisplacive member 275, the lower thin film electrode 265, a conduit 284 and an elastic member 255.

The ensuing steps are similar to those for forming the first embodiment.

In comparison with the prior art array 100 of M×N thin film actuated mirrors 150 and method for the manufacture thereof, in the inventive array 200 of M×N thin film actuated mirrors 295 and the methods for the manufactures thereof, since the upper thin film electrode 285 is electrically connected individually to the connecting terminal 214 through the conduits 284, if one of the thin film actuated mirror 295 becomes inoperable for any reason, e.g., shortcircuit due to the scratch in the upper thin film electrode 285, other thin film actuated mirrors 295 in the same row or column in the array 200 are not affected.

It should be mentioned that, even though, the thin film actuated mirrors 295 and the methods for manufacturing thereof are described with respect to the case, wherein each of the thin film actuated mirrors has a unimorph structure, the ideas presented above can be equally well applied to a case wherein each of the thin film actuated mirrors has a bimorph structure, for the latter case just involves an additional electrodisplacive and electrode layers and the formation thereof.

While the present invention has been described with respect to certain preferred embodiments only, other modifications and variations may be made without departing from the spirit and scope of the present invention as set forth in the following claims.

What is claimed is:

1. An array of M×N thin film actuated mirrors, wherein M and N are integers, for use in an optical projection system, the array comprising:

an active matrix; and an array of M×N actuating structures, each of the actuating structures including an upper thin film electrode, a thin film elctorodisplacive member, a lower thin film electrode, an elastic member and a conduit, the thin film elctorodisplacive member being disposed between the upper and the lower thin film electrodes, and the elastic member being located below the lower thin film electrode, wherein the upper thin film electrode is electrically disconnected from other upper thin film electrodes and is connected electrically to the active matrix through the conduit.

2. The array of claim 1, wherein the active matrix includes a substrate and an array of M×N connecting terminals.

3. The array of claim 2 further includes a passivation layer, wherein a passivation layer, made of a phosphorsilicate glass(PSG) or a nitride, is located on top of the substrate.

4. The array of claim 3 further includes an etchant stopping layer, wherein the etchant stopping layer, made of a nitride, is positioned on top of the passivation layer.

5. The array of claim 1, wherein the lower thin film electrode is connected to a bias source and serves as a bias electrode.

6. The array of claim 1, wherein the upper thin film electrode function as a mirror and a signal electrode.

7. The array of claim 1, wherein the upper thin film electrode is electrically divided into an actuating and a light reflecting portions by a horizontal stripe.

8. The array of claim 7, wherein the actuating portion of the upper thin film electrode is connected electrically to the active matrix through the conduit.

9. A method for manufacturing an array of M×N thin film actuated mirrors, wherein M and N are integers, for use in an optical projection system, the method comprising the steps of:

preparing an active matrix including a substrate and an array of M×N connecting terminals;

forming a passivation layer on top of the active matrix;

depositing an etchant stopping layer on top of the passivation layer;

forming a thin film sacrificial layer on top of the etchant stopping layer;

creating an array of M×N pairs of empty cavities in the thin film sacrificial layer in such a way that one of the empty cavities in each pair is aligned with one of the connecting terminals;

depositing an elastic layer and a lower thin film layer, successively, on top of the thin film sacrificial layer including the empty cavities;

forming an array of M×N pairs of holes in such a way that one of the holes in each pair exposes a portion of the elastic layer on top of the corresponding connecting terminal;

depositing a thin film electrodisplacive layer on top of the lower thin film layer including the holes;

depositing an upper thin film layer on top of the thin film electrodisplacive layer;

iso-cutting the upper thin film layer to form an array of M×N upper thin film electrodes to thereby form a multiple layered structure, each of the upper thin film electrodes being disconnected from each other;

patterning the multiple layered structure into an array of M×N actuated mirror structures, until the thin film sacrificial layer is exposed; and removing the thin film sacrificial layer to thereby form the array of M×N thin film actuated mirrors.

10. The method of claim 9, wherein said step for forming the thin film sacrificial layer further includes a step for planarizing top thereof.

11. The method of claim 9, wherein the conduits are formed by using a lift-off method.

12. The method of claim 9, wherein each of the conduits, extending from top of a corresponding connecting terminal to the upper thin film layer, is formed by filling each of the holes with a metal.

13. The method of claim 9, wherein said step for depositing the upper thin film layer further includes:

creating an array of M×N pairs of openings, each of the openings extending from top of the thin film electrodisplacive member to top of the corresponding connecting terminal; and forming an array of M×N conduits.

14. The method of claim 13, wherein each of the conduits is electrically disconnected from the lower thin film layer by a material making up the elastic layer.

15. A method for manufacturing an array of M×N thin film actuated mirrors, wherein M and N are integers, for use in an optical projection system, the method comprising the steps of:

preparing an active matrix including a substrate and an array of M×N connecting terminals;

forming a passivation layer on top of the active matrix;

depositing an etchant stopping layer on top of the passivation layer;

forming a thin film sacrificial layer on top of the etchant stopping layer;

creating an array of M×N pairs of empty cavities in the thin film sacrificial layer in such a way that one of the empty cavities in each pair is aligned with one of the connecting terminals;

depositing an elastic layer and a lower thin film layer, successively, on top of the thin film sacrificial layer including the empty cavities;

forming an array of M×N pairs of holes in such a way that one of the holes in each pair exposes a portion of the elastic layer on top of the corresponding connecting terminal;

depositing a thin film electrodisplacive layer and an upper thin film layer, successively, on top of the lower thin film including the holes, thereby forming a multiple layered structure;

patterning the multiple layered structure into an array of M×N actuated mirror structures, until the thin film sacrificial layer is exposed; and removing the thin film sacrificial layer to thereby form the array of M×N thin film actuated mirrors.

16. The method of claim 15, wherein said step for forming the thin film sacrificial layer further includes a step for planarizing top thereof.

17. The method of claim 15, wherein said step for patterning the multiple layered structure further includes a step for iso-cutting the upper thin film layer to form an array of M×N upper thin film electrodes, each of the upper thin film electrodes being disconnected from each other.

18. The method of claim 15, wherein said step for iso-cutting the upper thin film layer further includes a step for patterning the upper thin film layer into an actuating and a light reflecting portions.

19. The method of claim 15, wherein the conduits are formed by using a lift-off method.

20. The method of claim 15, wherein each of the conduits, extending from top of a corresponding connecting terminal to the upper thin film layer, is formed by filling each of the holes with a metal.

21. The method of claim 15, wherein said step for forming the multiple layered structure further includes:

creating an array of M×N openings, each of the openings extending from top of the upper thin film layer to top of the corresponding connecting terminal; and forming an array of M×N conduits.

22. The method of claim 21, wherein each of the conduits is electrically disconnected from the lower thin film layer by a material making up the elastic layer.

* * * * *

UNITED STATES PATENT AND TRADEMARK OFFICE
CERTIFICATE OF CORRECTION

PATENT NO.     :  5,754,331
DATED          :  May 19, 1998
INVENTOR(S)    :  Yong-Ki Min It is certified that error appears in the above-identified patent and that said Letters Patent is hereby corrected as shown below:

On the title page: Item

[30]   Foreign Application Priority Data

May 29, 1996    [KR]    Rep. of Korea         96-18394

Signed and Sealed this

Twenty-first Day of July, 1998

Attest:

BRUCE LEHMAN

Attesting Officer

Commissioner of Patents and Trademarks